(12) United States Patent
Pietikäinen et al.

(10) Patent No.: US 12,345,245 B2
(45) Date of Patent: Jul. 1, 2025

(54) THRUSTER ASSEMBLY

(71) Applicant: Aurora Propulsion Technologies Oy, Espoo (FI)

(72) Inventors: Pihla Pietikäinen, Espoo (FI); Jaakko Laitinen, Espoo (FI); Perttu Yli-Opas, Espoo (FI); Vili Vilenius, Espoo (FI); Roope Takala, Espoo (FI); Pyry Peitso, Espoo (FI); Janne Sievinen, Espoo (FI)

(73) Assignee: AURORA PROPULSION TECHNOLOGIES Oy, Espoo (FI)

( * ) Notice: Subject to any disclaimer, the term of this patent is extended or adjusted under 35 U.S.C. 154(b) by 306 days.

(21) Appl. No.: 17/916,456

(22) PCT Filed: Apr. 1, 2021

(86) PCT No.: PCT/FI2021/050247
§ 371 (c)(1),
(2) Date: Sep. 30, 2022

(87) PCT Pub. No.: WO2021/198570
PCT Pub. Date: Oct. 7, 2021

(65) Prior Publication Data
US 2023/0037400 A1    Feb. 9, 2023

(30) Foreign Application Priority Data

Apr. 2, 2020 (FI) ...................................... 20205344

(51) Int. Cl.
*F16K 31/02* (2006.01)
*B64G 1/40* (2006.01)
(Continued)

(52) U.S. Cl.
CPC .............. *F03H 99/00* (2013.01); *B64G 1/401* (2013.01); *B64G 1/402* (2013.01); *F03H 1/0012* (2013.01);
(Continued)

(58) Field of Classification Search
CPC ......... B64G 1/402; F03H 1/0012; F02K 9/58; F16K 31/025
See application file for complete search history.

(56) References Cited

U.S. PATENT DOCUMENTS 2,960,303 A     11/1960   Smallpeice
5,339,623 A  *  8/1994   Smith ...................... B64G 1/26
                                                         60/229
(Continued)

FOREIGN PATENT DOCUMENTS

DE    2 054 062    5/1971
EP    3 269 651    1/2018
(Continued)

OTHER PUBLICATIONS

Hsu "Fracture Behavior of Multilayer Silicon Nitride/Boron Nitride Ceramics" (Year: 2005).*

(Continued)

*Primary Examiner* — Lorne E Meade
(74) *Attorney, Agent, or Firm* — Nixon & Vanderhye PC

(57) ABSTRACT

A thruster assembly, including a switch connected to a power source, a thruster, a propellant tank for storing and pressurising a propellant, and a propellant channel for guiding the propellant to the thruster. The thruster includes a space for receiving the propellant from the propellant channel, an electrically controlled heating element, a thruster body having a first thermal expansion coefficient, a valve component having a second thermal expansion coefficient, which is different than the first thermal expansion coeffi- (Continued)

cient, inside the thruster body, and a nozzle, wherein the valve component includes a sealing surface closing the nozzle in a first temperature, and the electrically controlled heating element in response to actuation of the switch heats said thruster to a second temperature where the thermal expansion of the thruster opens the nozzle.

13 Claims, 5 Drawing Sheets

(51) Int. Cl.
   *F02K 9/58* (2006.01)
   *F03H 1/00* (2006.01)
   *F03H 99/00* (2009.01)
   *G05D 7/06* (2006.01)
   *B64G 1/26* (2006.01)

(52) U.S. Cl.
   CPC ......... *F16K 31/025* (2013.01); *G05D 7/0635* (2013.01); *B64G 1/26* (2013.01); *F02K 9/58* (2013.01); *F05D 2300/50212* (2013.01)

(56) References Cited

U.S. PATENT DOCUMENTS

| | | | |
|---|---|---|---|
| 5,797,260 A | 8/1998 | Koppel et al. | |
| 9,777,674 B2* | 10/2017 | Zhang | F02K 9/52 |
| 2012/0186223 A1* | 7/2012 | Abel | F02K 9/978 |
| | | | 60/228 |
| 2013/0167377 A1 | 7/2013 | Gillespie | |

FOREIGN PATENT DOCUMENTS

| | | |
|---|---|---|
| FR | 2 678 751 | 1/1993 |
| FR | 3 069 899 | 2/2019 |
| GB | 2464954 | 5/2010 |
| WO | 01/11437 | 2/2001 |
| WO | 2019/020330 | 1/2019 |

OTHER PUBLICATIONS

Zhang, T. and Miyamoto, C.M., "3D Printing: A Cost Effective and Timely Approach to Manufacturing of Low-Thrust Engines", 50th AIAA/ASME/SAE/ASEE Joint Propulsion Conference, AIAA-2014-3502, Jul. 28-30, 2014, Cleveland, Ohio, pp. 1-23. (Year: 2014).*
International Search Report dated Aug. 6, 2021, for PCT/FI2021/050247, 4 pp.
Written Opinion of the ISA dated Aug. 6, 2021, for PCT/FI2021/050247, 6 pp.
Notification of Transmittal of the International Preliminary Report on Patentability dated Apr. 4, 2022, for PCT/FI2021/050247, 6 pp.
Finnish Office Action dated Feb. 17, 2022, for FI 20205344, 5 pp.
Finnish Search Report dated Oct. 23, 2020, for FI 20205344, 2 pp.

* cited by examiner

THRUSTER ASSEMBLY

CROSS-REFERENCE TO RELATED APPLICATION(S)

This application is the U.S. national phase of International Application No. PCT/FI2021/050247 filed Apr. 1, 2021, which designated the U.S. and claims priority to FI 20205344 filed Apr. 2, 2020, the entire contents of each of which are hereby incorporated by reference.

FIELD OF THE INVENTION

The present invention relates to a propulsion engine, and more particularly to an electrothermal thruster assembly.

BACKGROUND OF THE INVENTION

Recent trend in satellite size have been towards highly miniaturized propulsion systems. A CubeSat is a type of miniaturized satellite for space research that is made up of multiples of 10 cm×10 cm×10 cm cubic units. CubeSats and similar smaller satellites have raised a demand for miniature propulsion systems, to and a great majority of recent and upcoming launches are in the CubeSat size range. Mission goals range from simple technological experimentations aiming to increase the educational know-how about space technology to highly specialized scientific mission tailored for diverse research programs.

Some of the problems associated with miniaturing a propulsion system is how to accurately control the satellite attitude. For instance, the research missions typically require exact aiming of their instruments at the Earth, the Sun, or at some fixed points in the celestial sphere. In many cases, the scientific value of the mission may even be critically dependable on the precise controllability of the satellite and the real-time information about the satellite attitude.

Besides the obvious needs in instrument aiming, attitude control can be used as a tool to prolong satellite operational lifetime as it enables e.g. optimal aiming of solar panels for the generation of electrical energy, and satellite attitude adjustments to minimize air drag on Low Earth Orbits (LEO) that would otherwise lead to premature deorbiting. Other use includes collision avoidance that can be efficiently achieved even with one thruster system.

Designing and mass-manufacturing a reliable and cost-effective solution on the growing demand of thruster systems that would equip small satellites with the attitude control and small orbit change capabilities require high competence in micromechanics and microelectronics.

BRIEF DESCRIPTION OF THE INVENTION

An object of the present invention is to provide an assembly to solve the above problems. The objects of the invention are achieved by an arrangement which are characterized by what is stated in the independent claim. The preferred embodiments of the invention are disclosed in the dependent claims.

The invention is based on the idea of a thruster which comprises a thruster body and a valve component having different thermal expansion coefficients.

Advantages of the arrangement is to provide a well-suited thruster system for series production that is reliable in miniaturisation and controllability.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
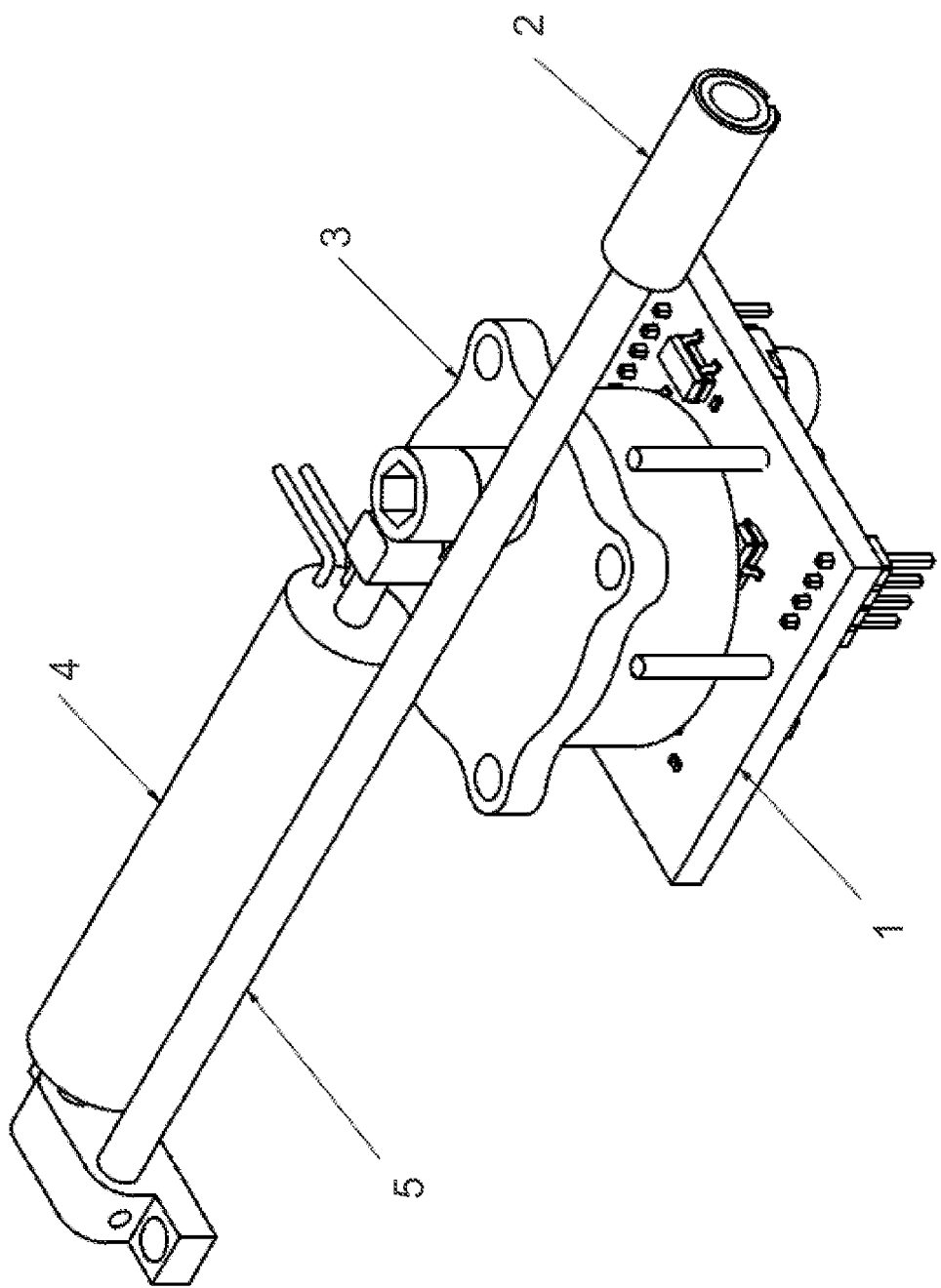
FIG. 1 illustrates an embodiment of a thruster assembly.

FIG. 1 illustrates an embodiment of a thruster assembly, which comprises a switch 1, a thruster 2, a propellant tank 3, a main valve 4 and a propellant channel 5. The switch 1 can be part of the electrical control system, which is connected to a power source, for instance photovoltaic cells. The propellant tank 3 is for storing and pressurising a propellant. A suitable propellant can be for instance water or other gasifiable or gaseous substance or mixture such as xenon. The main valve 4 is configured to control the propellant flow through the propellant channel 5 which guides the propellant to the thruster 2, where it is heated and expelled which generates propulsion to move the thruster assembly and consequently the satellite or spacecraft attached to it. The main valve 4 adds additional security against leaks when operating in vacuum. A small impulse bit from the main valve 2 enables accurate positioning and dynamic control when moving a spacecraft.

The propellant tank 3 may be connected to more than one main valve 4 and the main valve 4 may control the propellant flow to more than one thruster 2. In some embodiments of a thruster assembly, the propellant channel 5 may be directly connected to the tank 3 without a main valve 4. The propellant is fed to the thruster 2 by pressurizing the propellant in the tank 3 with a diaphragm or bladder structure using a pressurizing agent or a mechanical spring, or by other means such as mechanical pumping or using the propellant itself as a pressurizing agent. In some embodiments one end of the propellant channel 5 can be joined to the thruster 2 in a fixed connection, and in some embodiments the propellant channel 5 can be manufactured as part of the thruster 2. In some embodiments the propellant channel 5 can be a capillary pipe. By using the capillary pipe, the pressure in the propellant tank 3 can be kept lower compared to other types of channels.

Figure 2:
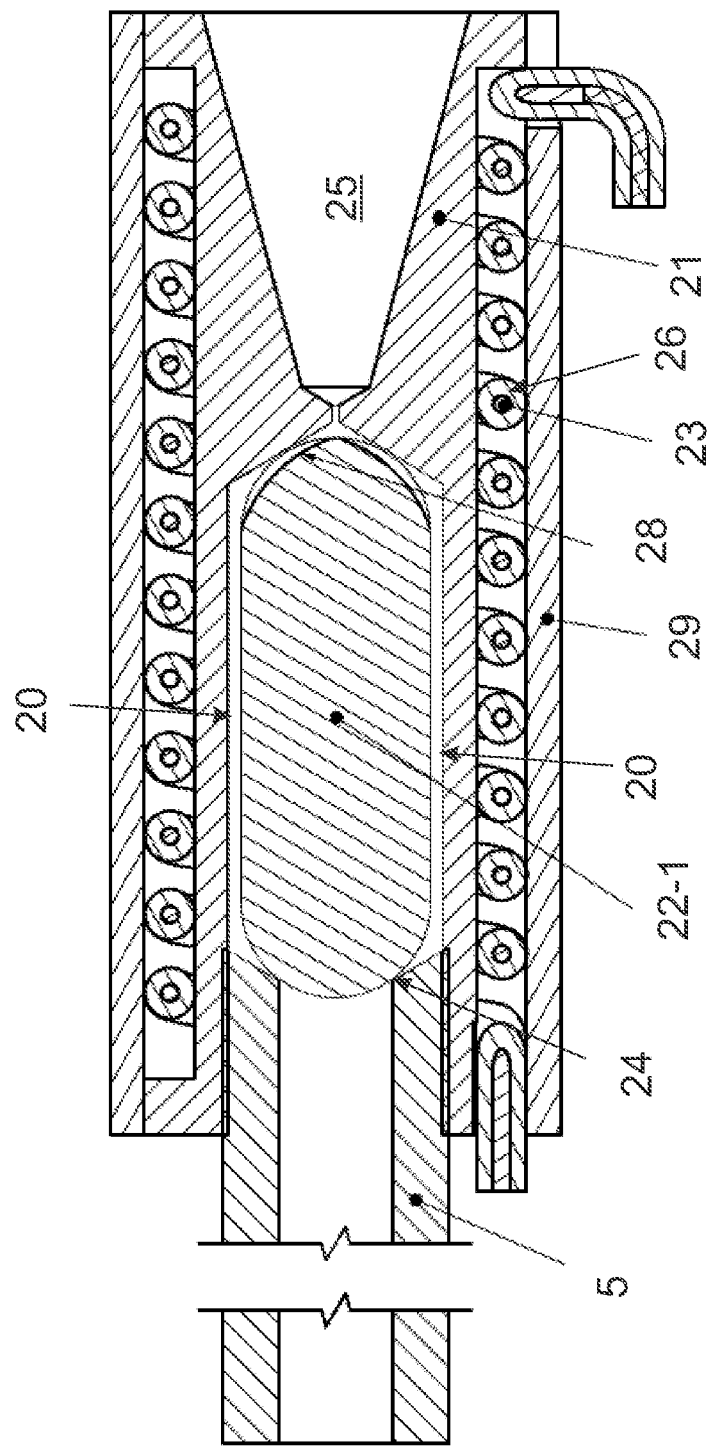
FIG. 2 illustrates a cross-sectional view of a first embodiment of a thruster.

FIG. 2 illustrates a cross-sectional view of an embodiment of the thruster. The thruster 2 comprises a thruster body 21, a valve component 22, a space 20 between the thruster body 21 and the valve component 22, an electrically controlled heating element 23 and a nozzle 25. The space 20 is for receiving the propellant from the propellant channel 5 and heating the propellant before it is released to the nozzle 25.

The thruster body 21 can be a hollow housing made of a material with a first thermal expansion coefficient, and it can be for instance titanium with the linear thermal expansion coefficient of $9 \cdot 10^{-6}$ $K^{-1}$. The valve component 22 is arranged inside the thruster body 21 and it can be a capsule 22-1 comprising a cylindrical section with hemispherical ends. This kind of shape is simple to manufacture in micro scale, when designing miniaturized satellites. In some embodiments, other shapes can also be implemented, such as a ball or a needle with varying diameters. The valve component 22 is made of a material with a second thermal expansion coefficient, which is different than said first thermal expansion coefficient, and it can be for instance silicon with the linear thermal expansion coefficient of 3 $10^{-6}$ K$^{-1}$.

In this embodiment, the first thermal expansion coefficient is bigger than the second thermal expansion coefficient. In another embodiment, the first thermal expansion coefficient can be smaller than the second thermal expansion coefficient. Different materials have different thermal expansion coefficients and the most preferable material duos are metallic and ceramic, such as stainless steel and silicon carbide, or metals with large difference in thermal expansion coefficients, such as copper or aluminium, or other materials with sufficient operating temperature and thermal expansion coefficient difference. The linear thermal expansion coefficient difference is selected in accordance with the desired temperature difference between nominal and working temperature and other parameters such as the thruster size and static installation stress. A lower thermal expansion coefficient difference requires a larger difference in temperature.

The electrically controlled heating element 23 is configured to heat the thruster 2 in response to actuation of the switch 1 from a first temperature to a second temperature. For instance, the first temperature may be the spacecraft's regulated body temperature, which is typically −5 . . . 20° C., and the second temperature may be 600 . . . 1000° C. where the thermal expansion caused by the thruster body 21 and the valve component 22 comprising a sealing surface 24 closes the nozzle 25. The electrically controlled heating element 23 can comprise for instance a resistive wire coiled around the thruster body 21 or any other heating element to heat the thruster 2 to the second temperature such as an induction heater or a selectively plated resistive layer on nonconductive material. For example, a difference in thermal expansion coefficients of 5 $10^{-6}$ K$^{-1}$ with a 10 mm long valve component and 800° C. temperature difference from the first temperature to the second temperature produces a gap of 0.04 mm at the sealing surface 24, which is suitable for allowing the propellant flow in the thruster 2. When the propellant is heated to the second temperature, the pressure increases because of kinetic energy and causes the thruster assembly to move in space when the heated gas is expelled from the nozzle 25. When the electrically controlled heating element 23 cools down, the temperature of the thruster 2 decreases back to the first temperature and the sealing surface 24 closes the nozzle 25 again. The electrically controlled heating element 23 enables fast electric control of the thrust by controlling both the valve component 22 and heating the propellant. It is a simple and efficient solution to drive the thruster 2 on and off.

As shown in FIG. 2, at the first temperature, the valve component 22 is compressed between the thruster body 21 and the propellant channel 5, and the valve component 22 having the sealing surface 24 where the propellant channel 5 contacts said valve component 22. The thruster body 21 and the propellant channel 5 are in the fixed connection by laser welding, for instance. The sealing surface in FIG. 2 refers to the surface of the valve component 22 contacting the propellant channel 5. However, in another embodiment (for instance FIGS. 3A-3D), it may refer to the surface of the valve component 22 contacting the thruster body 21. When contacting, the nozzle 25 is closed and prevents the propellant to be expelled. This structure allows simultaneously propellant heating and valve operations. The valve component 22 will cool down faster after heating power is turned off and increases reaction speed of the thruster 2.

When heated to the second temperature, the thruster body 21 is expanding more than the valve component and thus, releasing the sealing surface 24 from the propellant channel 5. Releasing in this context refers to separating the valve component 22 and the propellant channel 5 or the thruster body 21, and forming the gap at the sealing surface 24 and thus, opening the nozzle 25. When the sealing surface 24 is released, the valve component 22 may move inside the space 20 and is pushed towards the nozzle 25 by the pressure of the propellant. In some embodiments, the front end of the valve component 22 further comprises channels 28 so the propellant flow is not restricted when the valve component 22 is pressed towards the nozzle 25. In this context, the front end refers to the end closest to the nozzle 25.

The sealing surface 24 is configured to be contacted when the thruster body 21 and the valve component 22 are in the first temperature which prevents the propellant leaking towards the nozzle 25. The sealing surface 24 is configured to be released when the thruster body 21 and the valve component 22 are in the second temperature which allows the propellant to pass towards the nozzle 25. In some embodiments, one end of the valve component 22 is in fixed connection with the thruster body 21, which can be achieved with laser welding or the valve component 22 and the thruster body 21 threaded together, for instance. Fixing the valve component 22 with the thruster body 21 enables the temperature difference required for releasing the sealing surface 24 to be adjusted by changing temperature and force with which the valve component 22 is inserted to the thruster body 21 during assembly to induce a stress in the materials. The valve component 22 or the thruster body 21 may comprise flow channels similar to the channels 28 mentioned above for passing the propellant towards the nozzle 25 when the valve component 22 is in fixed connection with the thruster body 21. Said flow channels can be at a location of the fixed connection or next to it. The valve component 22 may be freely floating between constricting elements allowing more extreme differential thermal expansion.

The nozzle 25 can be manufactured as part of the thruster body 21 and comprise a propelling nozzle bore such as a converging-diverging nozzle. The converging-diverging nozzle is shaped like a tube that is narrowed or pinched in the middle and arranged as asymmetric hourglass shape. It is used to accelerate a hot, pressurized propellant passing through it to a higher supersonic speed in the thrust direction, by converting the heat energy of the flow into kinetic energy resulting in an additional turbo boost. At the propelling nozzle bore, where the cross-sectional area is at its minimum, the propellant velocity locally becomes sonic. As the converging-diverging nozzle cross-sectional area increases, the propellant begins to expand, and the propellant flow increases to supersonic velocities. As the propellant exits the propelling nozzle bore, the increase in area allows for it to undergo a Joule-Thompson expansion wherein the propellant expands at supersonic speeds from high to low pressure pushing the velocity of the mass flow beyond sonic speed. This reduces power consumption and increases the thrust, as well as enables the integration of the system into multiple propellant systems and the utilization of different propellants.

Manufacturing the nozzle 25 as part of the thruster body 21 refers to one solid piece where the nozzle 25 is integrated with the thruster body 21. The to integrated structure can make a cold gas system with a simple change of the thruster tip. This increases usable applications of the thruster 2 when the cold gas system can convert to a hot gas system with the turbo boost by heating not only valve component 22 but as well as the propellant.

The electrically controlled heating element 23 can be insulated with the insulator 26 such as glass fibre or other nonconductive material around the heating element 23 to electrically insulate it from itself and the thruster body 21. The thruster body 21 and the insulated electrically controlled heating element 23 can be further surrounded by a sleeve 29 to keep the electrically controlled heating element 23 in place and reflect some of the heat radiated but the thruster body 21 and the heating element 23 back towards the thruster body 21. The sleeve 29 in this context refers to an outer layer of the thruster 2 and it can be made of same or a different material as the thruster body 21. The heating element 23 may affect specially the nozzle section, with its specific temperature as well as the thermal expansion coefficient, which is different from the one in the earlier section of the thruster 2.

Figures 3C, 3D:
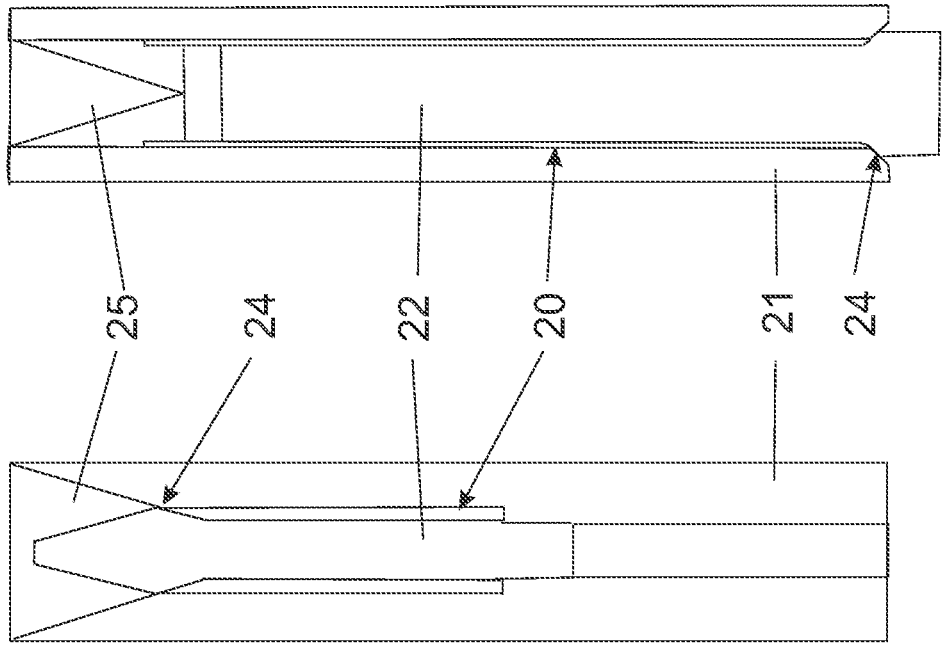
FIGS. 3A-3D illustrates additional examples of the first embodiment of the thruster.
Figures 3A, 3B:
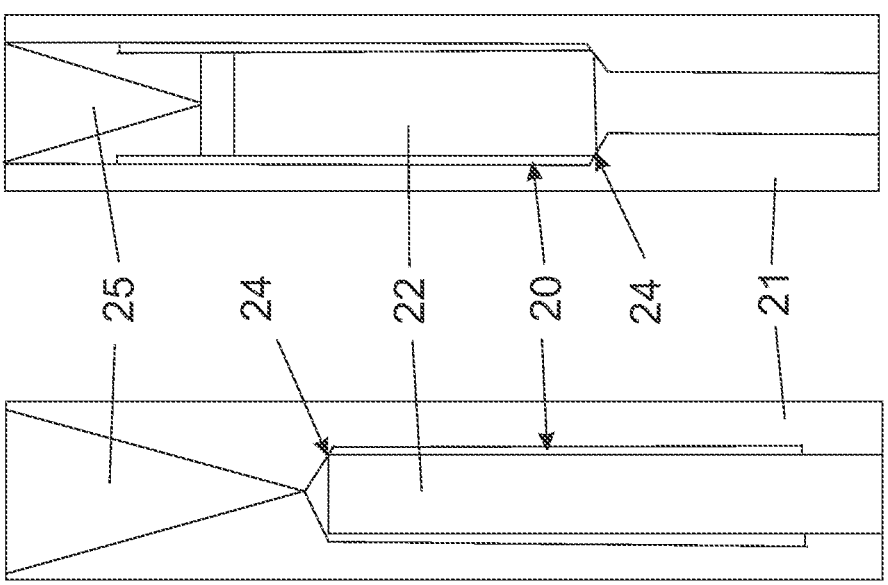

FIGS. 3A-3D illustrates additional examples how the thruster body 21, the valve component 22, the space 20, the sealing surface 24 and the nozzle 25 can be designed. The sealing surface 24 of the valve component 22 in FIGS. 3A-3D is the surface contacting the thruster body 21. All of them follow the same principle where the thruster body 21 has a different thermal expansion coefficient compared to the thermal expansion coefficient of the valve component 22. For instance, in FIGS. 3A and 3B, the valve component 22 has lower thermal expansion coefficient compared to the thermal expansion coefficient of the thruster body 21, and in FIGS. 3C and 3D, the valve component 22 has higher thermal expansion coefficient compared to the thermal expansion coefficient of the thruster body 21. In cases of 3C and 3D, the thermal expansion allows the valve component 22 to elongate more than the thruster body 21 and thus releasing the sealing surface 24. The sealing surface 24 can situate closer to the nozzle 25 as shown in FIGS. 3A and 3C, or it can situate closer to the propellant channel 5 as shown in FIGS. 3B and 3D.

Figure 4:
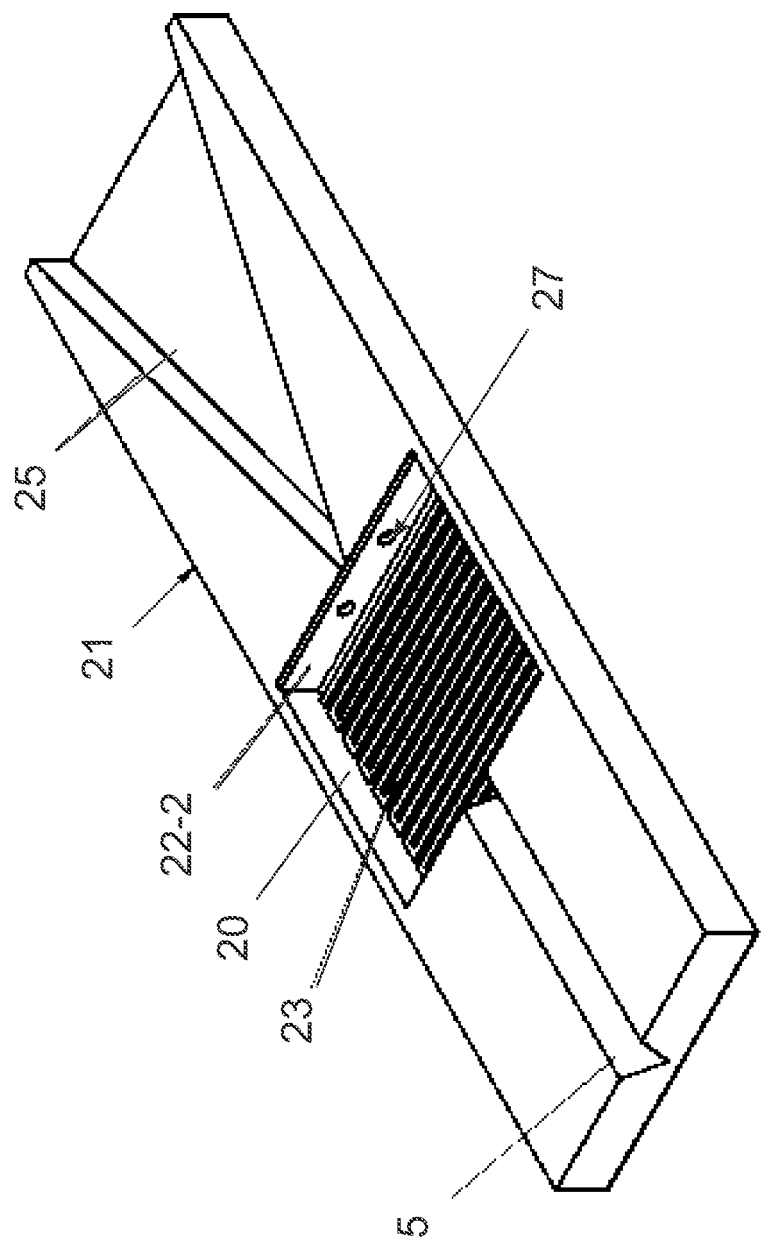
FIG. 4 illustrates an open view of a second embodiment of a thruster.
Figure 5B:
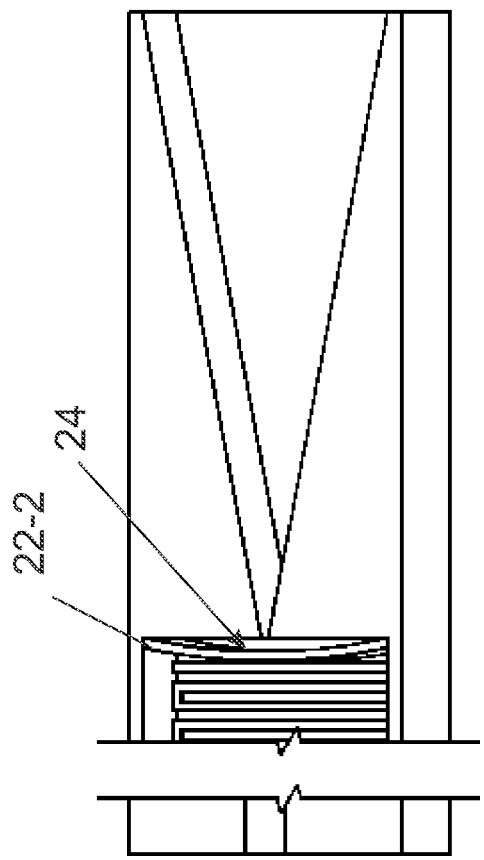
FIG. 5A illustrates the embodiment of FIG. 4 in a first temperature and FIG. 5B in a second temperature.
Figure 5A:
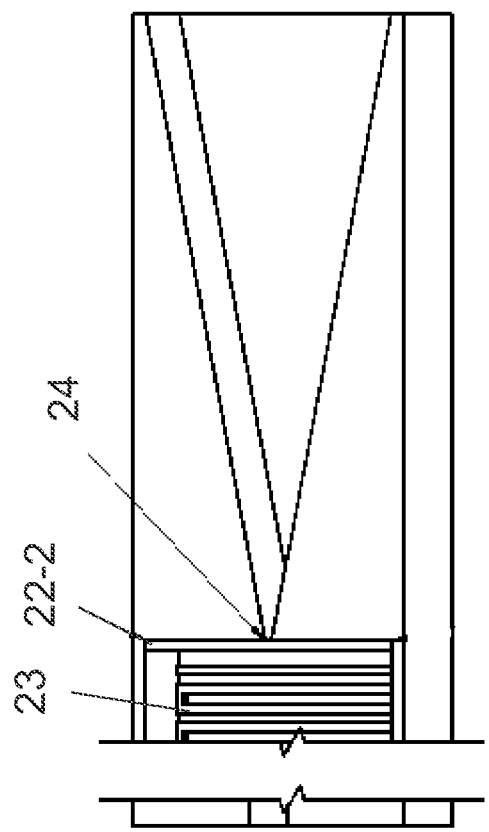

FIGS. 4, 5A and 5B illustrate an open view of another embodiment of the thruster 2. The principle of contacting and releasing the sealing surface 24 is similar compared to the one described in relation to FIG. 2. However, in this implementation, the whole thruster 2 may be made as a laminar part with laminated ceramics or as a part of micro-electromechanical systems (MEMS). Laminar and to MEMS lithography technologies allow construction from single block of raw material which reduces assembly and seams in the final product. Using this technology allows the thruster to be further miniaturized into a nanotechnological structure. This can allow a triple integration, where the nozzle 25, the valve component 22 and the heating element 23 are integrated in the same system. The valve component 22 in this embodiment is arranged as a valve strip 22-2 with higher thermal expansion coefficient than the thruster body 21. In some embodiments, the laminar structure may allow the propellant channel 5 and the nozzle 25 to be manufactured directly to the same part with the thruster body 21. The ability to manufacture the propellant channel 5 to the same part with the thruster body improves the manufacturability of the entire thruster 2.

The valve strip 22-2 can be made of one or more materials, such as titanium or copper-titanium bimetal. The valve strip 22-2 can be manufactured out of a single functional material design. It comprises at least one aperture 27 or other feature for allowing flow, and a surface which contacts an entrance of the nozzle 25 and the thruster body 21, forming the sealing surface 24, when the thruster 2 is in the first temperature, as shown in FIG. 5A, and opens the nozzle 25 when the thruster 2 is heated to the second temperature, as shown in FIG. 5B. Both ends of the valve strip 22-2 are constrained by the thruster body 21 in such a way to prevent the valve strip 22-2 from shifting inside the thruster body 21. This can be achieved for instance by features such as notches in the thruster body 21 or a solid connection between the two, such as a weld.

When in the first temperature, the valve strip 22-2 is straight and having a same width as the space 20 closest to the nozzle 25 and the side towards the nozzle 25 is in contact with the thruster body wall such way that the sealing surface 24 is contacted because the apertures 27, the sealing surface 24 or both are blocked by said wall. Because the thermal expansion of the valve strip 22-2 is higher than the thruster body 21, or in the case of a bimetal strip, the thermal expansion of the side towards the nozzle 25 is lower, it allows the valve strip 22-2 to bend inwards towards the space 20. The bending releases the sealing surface 24 and opens the nozzle 25 and allowing the propellant to flow through the apertures 27 which are no longer blocked by said wall.

The electrically controlled heating element 23 can comprise a resistive element situated inside the thruster body 21 that can be for instance selectively plated on the thruster body 21. The electrically controlled heating element 23 can alternatively be situated outside the thruster body 21.

With above-mentioned thruster designs, a limited number of components and miniaturisation can be realized. The thruster 2 can be less than 5 mm long. In some embodiments, only 2 parts are needed to assemble the whole thruster 2. Decreasing the number of the components also decreases the number of possible causes of failure which results in higher product reliability and decreasing system assembly time and weight. The design allows manufacturability in series production while increasing the component quality and repeatability in production. It also allows the scalability of the maximum thrust and impulse allowing the same basic design for a large range of thrust levels.

The invention claimed is:

1. A thruster assembly, comprising:
a switch connected to a power source;
a thruster;
a propellant tank configured to store and pressurize a propellant; and
a propellant channel configured to guide the propellant to the thruster,
wherein the thruster comprises:
  a space configured to receive the propellant from the propellant channel;
  an electrically controlled heating element;
  a thruster body having a first thermal expansion coefficient; and
  a valve component having a second thermal expansion coefficient, which is different than the first thermal expansion coefficient, inside the thruster body,
wherein the thruster assembly further comprises a converging-diverging nozzle comprising a propelling nozzle bore, wherein the converging-diverging nozzle is manufactured at the same time as and formed as one integral part with the thruster body,
wherein the valve component comprises a sealing surface closing the converging-diverging nozzle in a first temperature, wherein a front end of the valve component further comprises channels for propellant flow and the sealing surface is located at an opposite end, and wherein the electrically controlled heating element in response to actuation of the switch is configured to heat said thruster to a second temperature where the thermal expansion of the thruster opens the converging-diverging nozzle.

2. The thruster assembly according to claim 1, wherein one end of the valve component is in fixed connection with the thruster body.

3. The thruster assembly according to claim 1, wherein the valve component is a capsule comprising a cylindrical section.

4. The thruster assembly according to claim 1, wherein the thruster body has a higher thermal expansion coefficient than the valve component.

5. The thruster assembly according to claim 1, wherein the thruster body comprises a laminar structure with laminated ceramics or MEMS.

6. The thruster assembly according to claim 1, wherein the sealing surface is a surface of the valve component contacting the thruster body, or a surface of the valve component contacting the propellant channel.

7. The thruster assembly according to claim 1, wherein the thruster body is surrounded by a sleeve.

8. The thruster assembly according to claim 1, wherein the assembly further comprises a main valve for controlling propellant flow to the thruster.

9. The thruster assembly according to claim 1, wherein the electrically controlled heating element comprises a resistive wire coiled around the thruster body or situated inside the thruster body.

10. The thruster assembly according to claim 1, wherein the thruster is less than 5 mm long.

11. A thruster assembly, comprising:
a switch connected to a power source;
a thruster;
a propellant tank configured to store and pressurize a propellant; and
a propellant channel configured to guide the propellant to the thruster,
wherein the thruster comprises:
 a space configured to receive the propellant from the propellant channel;
 an electrically controlled heating element;
 a thruster body having a first thermal expansion coefficient; and
 a valve component having a second thermal expansion coefficient, which is different than the first thermal expansion coefficient, inside the thruster body,
wherein the thruster assembly further comprises a converging-diverging nozzle manufactured to a same part with the thruster body and comprising a propelling nozzle bore,
wherein the valve component comprises a sealing surface closing the converging-diverging nozzle in a first temperature,
wherein the electrically controlled heating element in response to actuation of the switch is configured to heat said thruster to a second temperature where the thermal expansion of the thruster opens the converging-diverging nozzle,
wherein the thruster body comprises a laminar structure with laminated ceramics or MEMS, and
wherein the valve component is a valve strip comprising at least one aperture.

12. The thruster assembly according to claim 11, wherein the valve strip has a higher thermal expansion coefficient than the thruster body, and both ends of the valve strip are in fixed connection with the thruster body such that when heated to the second temperature, the valve strip is configured to bend inward because of thermal expansion.

13. A thruster assembly, comprising:
a switch connected to a power source;
a thruster;
a propellant tank configured to store and pressurize a propellant; and
a propellant channel configured to guide the propellant to the thruster,
wherein the thruster comprises:
 a space configured to receive the propellant from the propellant channel;
 an electrically controlled heating element;
 a thruster body having a first thermal expansion coefficient; and
 a valve component having a second thermal expansion coefficient, which is different than the first thermal expansion coefficient, inside the thruster body,
wherein the thruster assembly further comprises a converging-diverging nozzle manufactured to a same part with the thruster body and comprising a propelling nozzle bore,
wherein the valve component comprises a sealing surface closing the converging-diverging nozzle in a first temperature,
wherein the electrically controlled heating element in response to actuation of the switch is configured to heat said thruster to a second temperature where the thermal expansion of the thruster opens the converging-diverging nozzle,
wherein the thruster body comprises a laminar structure with laminated ceramics or MEMS, and
wherein the laminar structure allows the propellant channel to be manufactured to the same part with the thruster body.

* * * * *